US008345976B2

United States Patent
Wang et al.

(10) Patent No.: US 8,345,976 B2
(45) Date of Patent: Jan. 1, 2013

(54) SYSTEMS AND METHODS FOR SEGMENTING DIGITAL IMAGES

(75) Inventors: Su Wang, San Jose, CA (US);
Shengyang Dai, San Jose, CA (US);
Akira Nakamura, Cupertino, CA (US);
Takeshi Ohashi, Kanagawa (JP); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 342 days.

(21) Appl. No.: 12/852,096

(22) Filed: Aug. 6, 2010

(65) Prior Publication Data
US 2012/0033862 A1 Feb. 9, 2012

(51) Int. Cl.
*G06K 9/34* (2006.01)
(52) U.S. Cl. .................... 382/173; 382/128; 382/154
(58) Field of Classification Search ............ 382/173, 382/128, 133, 166, 282, 294, 307; 128/920; 43/63, 164; 600/407
See application file for complete search history.

(56) References Cited

U.S. PATENT DOCUMENTS

| 6,928,314 B1 * | 8/2005 | Johnson et al. ........... 600/407 |
| 7,693,349 B2 * | 4/2010 | Gering ...................... 382/294 |
| 8,077,959 B2 * | 12/2011 | Dekel et al. ............... 382/133 |
| 2008/0304616 A1 | 12/2008 | Van Uitert, Jr. et al. | |

OTHER PUBLICATIONS

Jerebko, Anna K., Malley, James D., Franaszek, Marek, and Summers, Ronald M., Computer-aided polyp detection in CT colonography using an ensemble of support vector machines, International Congress Series, vol. 1256, Jun. 2003, pp. 1019-1024.

* cited by examiner

*Primary Examiner* — Anh Hong Do
(74) *Attorney, Agent, or Firm* — Haverstock & Owens LLP

(57) ABSTRACT

Methods and systems disclosed herein provide the capability to automatically process digital pathology images quickly and accurately. According to one embodiment, an digital pathology image segmentation task may be divided into at least two parts. An image segmentation task may be carried out utilizing both bottom-up analysis to capture local definition of features and top-down analysis to use global information to eliminate false positives. In some embodiments, an image segmentation task is carried out using a "pseudo-bootstrapping" iterative technique to produce superior segmentation results. In some embodiments, the superior segmentation results produced by the pseudo-bootstrapping method are used as input in a second segmentation task that uses a combination of bottom-up and top-down analysis.

15 Claims, 10 Drawing Sheets

SYSTEMS AND METHODS FOR SEGMENTING DIGITAL IMAGES

TECHNICAL FIELD

The present disclosure relates to systems and methods for segmenting digital image data and, more particularly, for segmenting digital pathology image data.

BACKGROUND

Pathology Imaging is one of the last fields in medical imaging yet to be digitized. Compared to other well-developed medical imaging modalities, such as Computed Tomography (CT) and Magnetic Resonance Imaging (MRI), digitized pathology images are characterized by super-high image resolution, non-uniform texture patterns, and densely-structured segments. In addition, the diversity of cancer types leads to constantly-changing image patterns, which makes the digitized pathology images become even more challenging for developing fully-automatic image segmentation algorithms.

Digitized pathology images are created from tissue samples stained with different methods for different diagnosing purposes, such as H&E (hematoxylin and eosin) and IHC (immunohistochemical) staining. Both of these staining methods are widely used in pathology, and H&E staining is particularly common for use in biopsy of suspected cancerous tissue.

Conventional pathology image analysis methods utilize human labor to individually examine and label the stained pathology images. This practice requires a great deal of human labor, is time consuming, and is subject to the subjectivity of the pathologist.

The digitalization of pathology image analysis has seen only small amounts of development. In digital pathology image analysis, digital pathology images are partitioned into meaningful segments, such that the pixels belonging to the same segment share the same features. Conventional techniques for segmenting digital pathology images, involve an operator using software to manually define the various image areas. The operator uses a mouse to control a cursor and outlines the various segments of a region of interest. This conventional technique is extraordinarily time consuming, and suffers from the subjectivity of the operator.

Some conventional automated image analysis techniques use bottom-up analysis. Bottom-up image analysis can be fully automatic, and requires no information outside of the image. In bottom-up analysis techniques, an image is analyzed using only the information contained in the pixels themselves, such as hue, saturation, or intensity. Intensity-based bottom-up techniques, when applied to segmentation tasks, are able to capture local edges and therefore provide relatively precise control of region contour information. However, without global cues, these techniques also carry the drawback of having high rates of false positives.

Other conventional image analysis techniques use top-down analysis. Such techniques use additional information, sometimes in the form of training data, to create models for feature extraction. Training data is labeled by a human operator, and machine learning processes are utilized to build models. When applied, these models are able to extract features from a digital pathology image. As applied to image segmentation tasks, top-down analysis has the benefit of relatively better discrimination power, particularly for images that differ more in texture than intensity. However, top-down techniques have the drawback of possible edge-displacement.

It is therefore desirable to provide a fully automatic image segmentation system and method, designed for digital pathology images, that reduces both the false positives of conventional bottom-up analysis and the edge displacement of conventional top-down analysis.

SUMMARY

Methods and systems disclosed herein provide the capability to automatically process digital pathology images quickly and accurately. According to one embodiment, a digital pathology image segmentation task may be divided into at least two sub-tasks. A first sub-task may be carried out utilizing both bottom-up analysis to capture local object boundaries and top-down analysis to use global information to eliminate false positives. In some embodiments, this sub-task is carried out using an integrated top-down and bottom up image analysis algorithm, called "pseudo-bootstrapping" to produce superior segmentation results in an iterative manner. In some embodiments, the superior segmentation results are used as input in a second sub-task that uses a different algorithm to combine both bottom-up and top-down image processing to achieve the final segmentation task.

The image segmentation methods and techniques presented may be beneficially applied to any type of image, and are not limited to use for pathology or medical imaging.

BRIEF DESCRIPTION OF DRAWINGS

The accompanying drawings, which are incorporated in and constitute a part of this specification, illustrate the invention and, together with the description, serve to explain the principles of the invention.

DETAILED DESCRIPTION

Reference will now be made in detail to exemplary embodiments as illustrated in the accompanying drawings. Wherever possible, the same reference numbers will be used throughout the drawings and the following description to refer to the same or like parts. These embodiments are described in sufficient detail to enable those skilled in the art to practice the invention and it is to be understood that other embodiments may be utilized and that changes may be made without departing from the scope of the present invention. The following detailed description, therefore, is not to be taken in a limited sense. The inventive image segmentation techniques are presented here as applied to digital pathology images of healthy and cancerous colon organ tissue. It is understood that these image segmentation techniques are not limited to use with colon organ images.

Exemplary systems and methods disclosed herein use information fusion and pseudo-bootstrapping techniques to combine top-down recognition via machine learning and intensity-based bottom-up analysis to improve performance over manually-defined ground truth labels.

Figure 1:
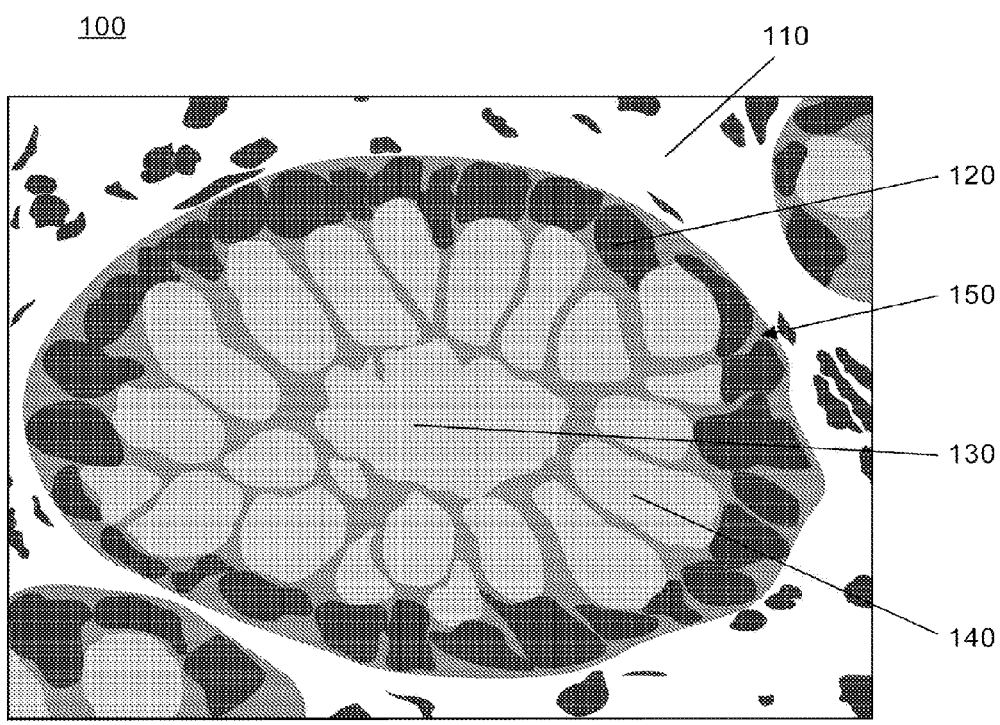
FIG. 1 shows a typical pathology image showing hematoxylin and eosin staining of a local region of normal colon organ tissue.

FIG. 1 shows a typical digitized pathology image 100 showing hematoxylin and eosin staining of a local region of normal colon organ tissue. Further illustrated are four different tissue types, the stroma 110, nucleus 120, lumen 130, and goblet 140. Collectively, the nucleus 120, lumen 130, and goblet 140 comprise the gland 150. The goblet and lumen taken together comprise the goblet-lumen region 160.

In exemplary embodiments described herein, digitized pathology images may be segmented into meaningful segments, such that those pixels belonging to the same segments share the same features. Each segment, consisting of pixels sharing the same features, e.g. color, intensity, grayscale shade, etc., represents an unique tissue type or image feature.

Figure 2:
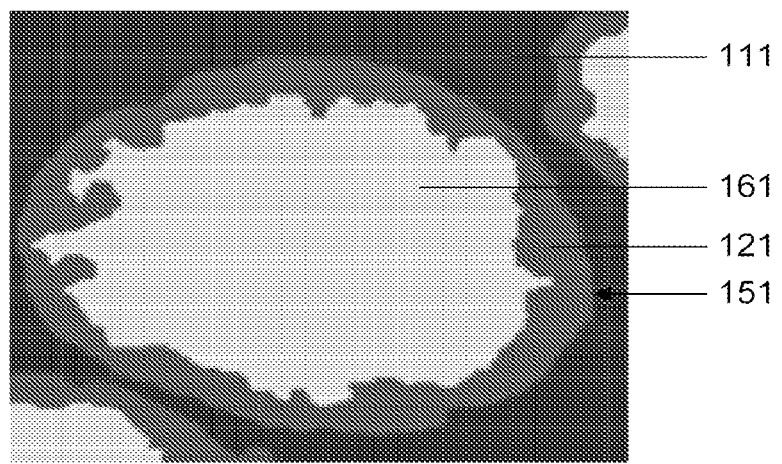
FIG. 2 shows a digital image depicting the expected segmentation output of the image in FIG. 1 after two sub-tasks.

For image segmentation purposes, exemplary methods and systems disclosed herein may be implemented as two serially conducted sub-tasks. After performing two sub-tasks, a digital image shown in FIG. 1 may be segmented as shown in FIG. 2. As shown in FIG. 2, the image is divided into a segmented stroma region 111, segmented nucleus region 121, and segmented goblet-lumen region 161. In FIG. 2, the pixels representing these three regions are distinguished by varying shades of gray, but in other embodiments may be distinguished by any other feature of the pixels, such as color or intensity. In other embodiments, the tissue may be segmented into fewer or more regions, or into different regions.

Figure 3:
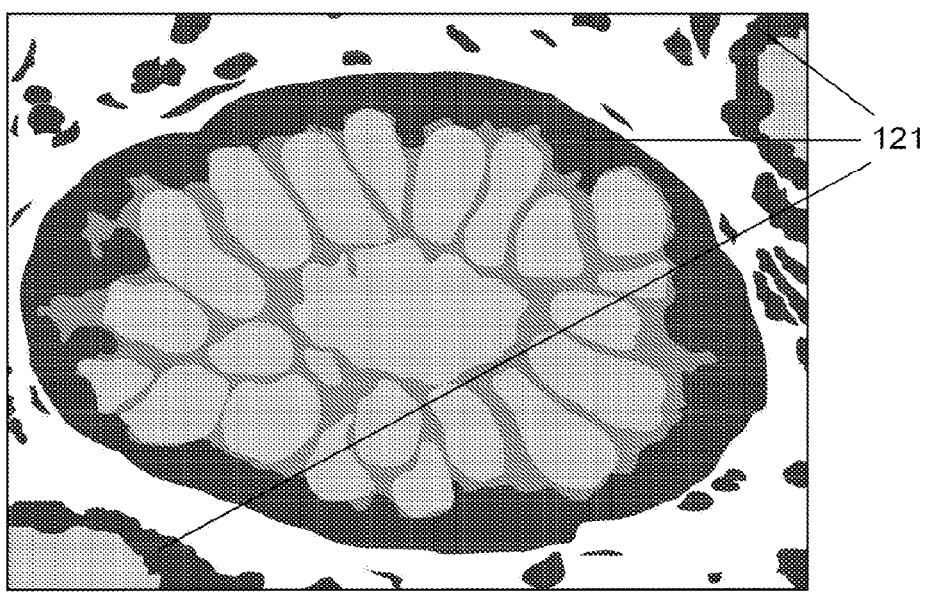
FIG. 3 shows a digital image depicting the expected segmentation output of the image in FIG. 1 after a first sub-task.

In a first sub-task, the nucleus region is isolated from the remainder of the gland. FIG. 3 shows a segmented nucleus image 300 depicting expected segmentation output of the image 100 in FIG. 1 after a first sub-task. The first sub-task may be accomplished through a process as shown in FIG. 4.

Figure 9:
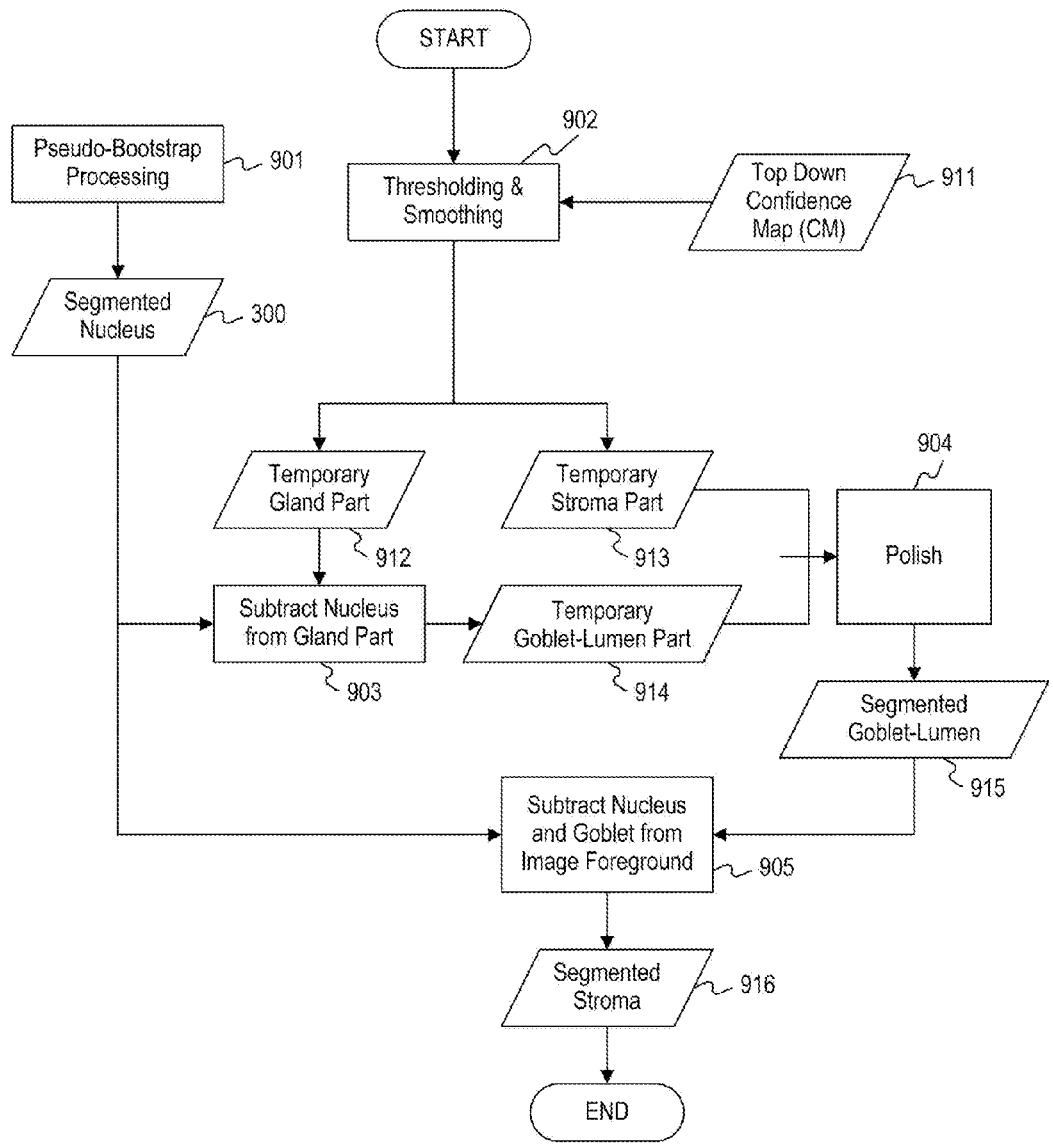
FIG. 9 is a flowchart showing the steps of an exemplary second segmentation sub-task consistent with the present disclosure.

In a second sub-task, the remaining image may be further segmented into a segmented stroma region 111 and a segmented goblet-lumen region 161, as shown in FIG. 2. The second sub-task may be accomplished through a process as shown in FIG. 9. While the exemplary digital pathology image 300 shown in FIG. 3 may make this task appear straightforward, in many cases, the digital pathology image to be segmented comprises abnormal tissue regions, for which distinguishing between the stroma region 110 and the goblet-lumen region 160 is quite difficult. Completion of the first sub-task, segmentation of the nucleus region 120 provides the working area for the second sub-task. Therefore, inaccurate segmentation of the nucleus region 120 will lead to inefficiencies during processing and inaccurate segmentation between the stroma region 110 and the goblet-lumen region 160 in the second sub-task. Conversely, more accurate segmentation of the nucleus region 120 in the first sub-task is expected to improve both processing efficiency and accuracy of the end result.

The steps of the first and second sub-tasks will be described with reference to FIGS. 4 and 9. One of skill in the art will recognize that these processes may also be described as one task and implemented as one method and/or system, although the method is described as two sub-tasks herein.

Figure 4:
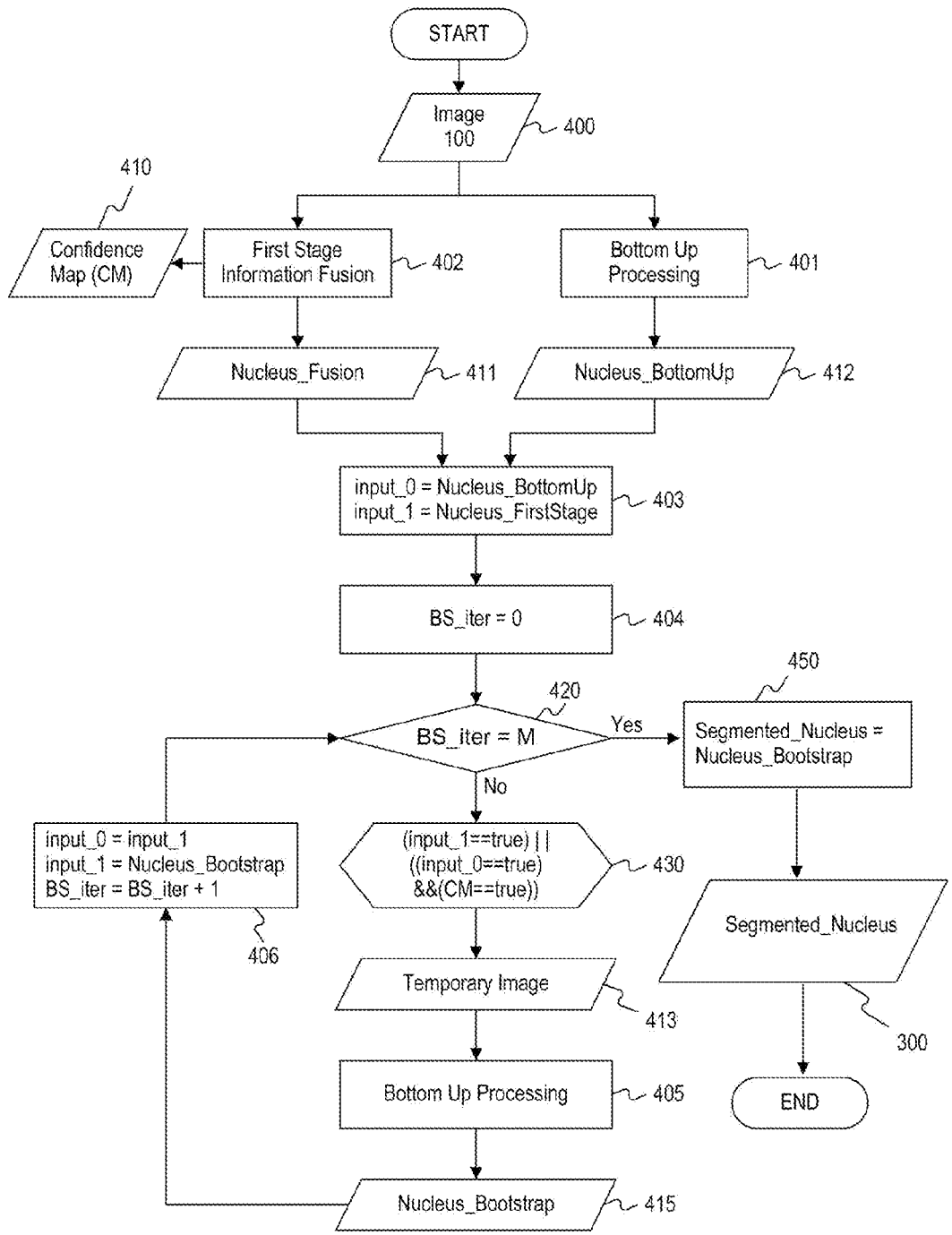
FIG. 4 is a flowchart showing the steps of an exemplary first segmentation sub-task, featuring information fusion and pseudo-bootstrapping, which is consistent with the present disclosure.

FIG. 4 is a flowchart showing the steps of an exemplary first image segmentation sub-task consistent with the present disclosure. As shown in FIG. 4, the method begins with a grayscale digital pathology image that has been converted from the original color digital pathology image, such as digital image 100 shown in FIG. 6a.

In at least one embodiment consistent with present disclosure, the image is subjected to bottom-up processing (step 401). Bottom-up processing may be performed so as to utilize only information that is inherent to the image itself, and may be fully automated.

Figure 5:
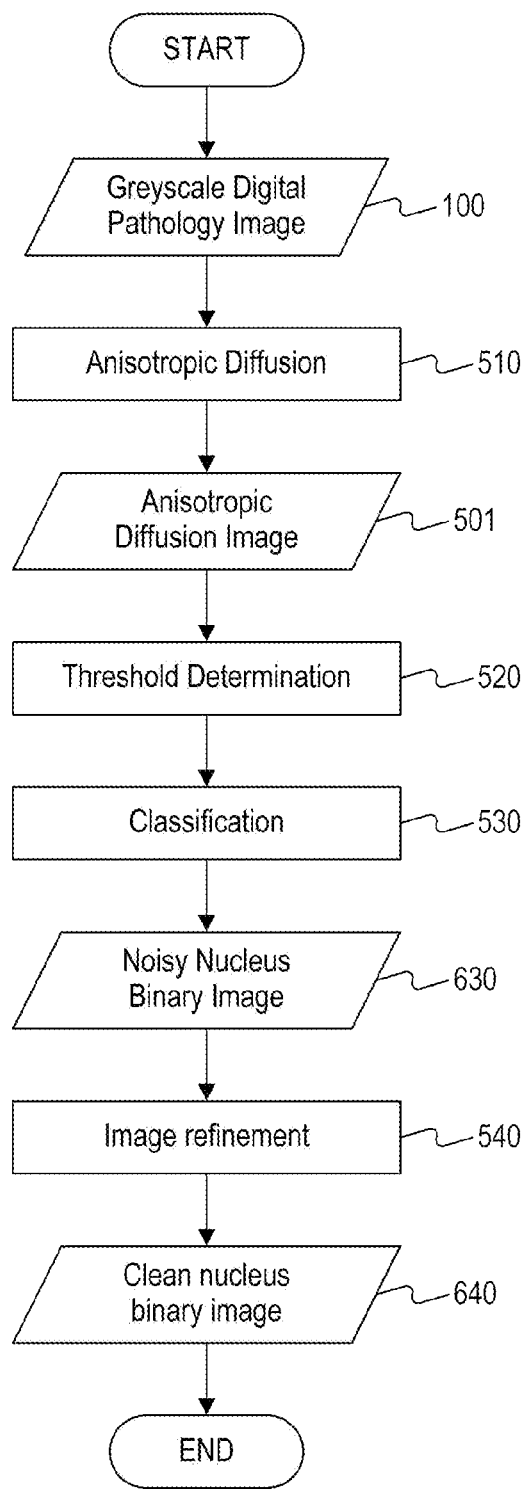
FIG. 5 is a flowchart showing the steps of an exemplary bottom-up processing used in the first segmentation sub-task.
Figure 6A:
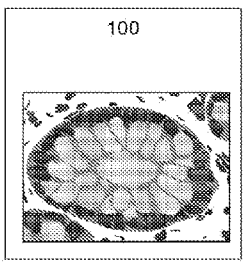
FIGS. 6a-6c show digital images depicting the flow of bottom-up image segmentation analysis.
Figure 6B:
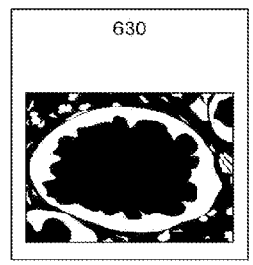
Figure 6C:
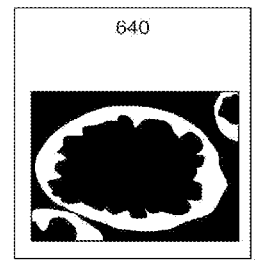

Bottom-up processing 401 may proceed as shown in FIG. 5, with reference to the images in FIGS. 6a-6c. For example, as discussed above, FIG. 6a shows a grayscale digital pathology image 100 that has been converted from an original color digital pathology image. The pixels of grayscale digital pathology image 100 may each have a grayscale value, which may be represented by an integer from 0 to 255, with 0 representing black and 255 representing white.

In bottom-up processing as shown in FIG. 5, anisotropic diffusion may be performed (step 510). Anisotropic diffusion is a technique that may be used for edge-preserving image smoothing. Anisotropic diffusion image 501 stores the results of this process when performed on grayscale image 100.

The anisotropic diffusion image 501 may then be processed with a thresholding method (step 520). One example of a suitable thresholding method is the Otsu binary thresholding method, which may be fully automated. The Otsu binary thresholding method, as performed in the present embodiment, automatically performs histogram-based binary image thresholding. The thresholding step determines an optimum grayscale threshold in order to classify all pixels in a binary fashion.

Each pixel of the anisotropic diffusion image 501 may then be classified based on the determined grayscale threshold (step 530). For example, each pixel may be classified as either white or black, depending on whether the grayscale value of the pixel is higher or lower than the determined threshold value. The resultant noisy gland nucleus binary image 630, as shown in FIG. 6b, contains pixels having only two different values. In the present embodiment, the grayscale pixels of the anisotropic diffusion image 501 having a value lower, i.e. darker, than the automatically determined threshold are classified as white, while those grayscale pixels of the anisotropic diffusion image 501 having a value higher, i.e. lighter, than the automatically determined threshold are classified as black. The resultant noisy nucleus binary image 630, therefore, appears to be a negative, or color reversed binary version of original grayscale image 100.

In exemplary embodiments, binary images produced by methods and techniques disclosed here may also understood as Boolean data sets. The individual white and black pixels of a binary image may be associated with TRUE and FALSE Boolean. For instance, each white pixel of a binary image may be associated with a TRUE value and each black pixel with a FALSE value. The reverse association, wherein FALSE values are associated with white pixels and TRUE values are associated with black pixels may also be applied.

The gland nucleus binary image 630 may then be further processed to remove noise and artifacts (step 540). In certain embodiments, image 630 may be further processed with connected component analysis, which may be used to determine the number of pixels in each connected area. A white pixel, for instance may be classified as connected if at least one of its four neighboring pixels is also white. A connected area consists of all pixels sharing a feature, e.g. being white, that are connected through neighbors. Connected component analysis utilizes a component-size threshold to eliminate all connected areas that consist of fewer pixels than the component-size threshold. The component-size threshold may be determined dynamically or may be supplied by a user. A person of skill in the art will recognize the value in applying different values of the component-size threshold based on image properties.

In exemplary embodiments, performing the further analysis on the noisy nucleus binary image 630 produces the clean nucleus binary image 640, as shown in FIG. 6c. In clean nucleus binary image 640, pixels that represent the nucleus region are white and all other pixels are black. Bottom-up processing methods, such as that depicted in FIG. 5 do well to capture local contours, but can produce false positives, that is, pixels that are not actually part of the nucleus region may be colored white or associated with a Boolean value of TRUE.

Returning now to FIG. 4, in an exemplary embodiment, grayscale digital pathology image 100 may also be subjected to an information fusion process (step 402), which will be described with reference to FIG. 7 and FIGS. 8a-8c. By performing both top-down and bottom-up image processing on grayscale digital pathology image 100, false positives resulting from bottom-up processing may be identified and reduced, while good local contour accuracy may be maintained.

Figure 7:
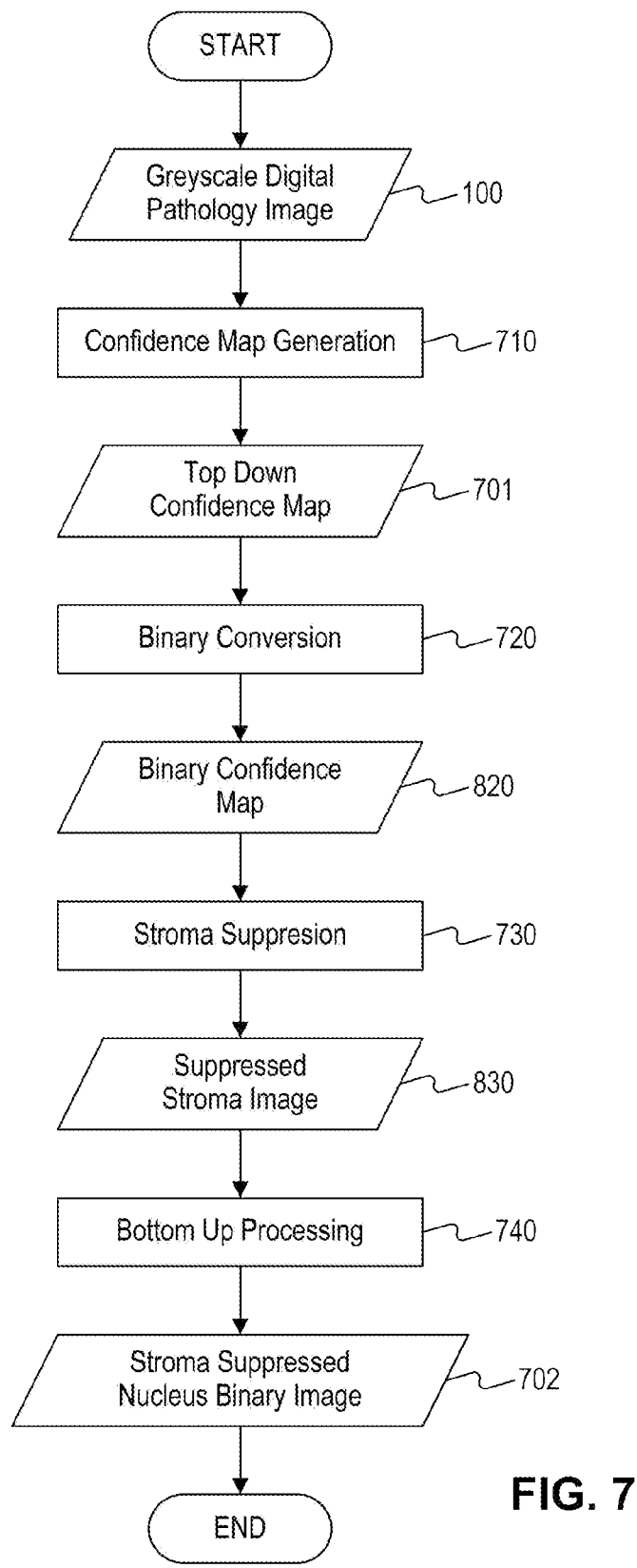
FIG. 7 is a flowchart showing the steps of an exemplary information fusion processing used in the first segmentation sub-task.

As shown in FIG. 7, in an exemplary information fusion process, a top-down confidence map 701 of grayscale pathology image 100 is generated (step 710). Top-down confidence map 701 illustrates the likelihood that each pixel represents an area of the gland region 150. In this example, the lighter a pixel is, the more likely it is to represent an area of the gland region 150. Conversely, because all of the pixels in the image represent either the gland region 150 or the stroma region 110, the darker a pixel is, the more likely it is to represent an area of the stroma region 110. In other examples, the reverse may be true. The top-down confidence map 701 of the present embodiment may be produced by any suitable technique. Confidence maps may be produced, for example, by feature extraction image analysis.

Figure 8A:
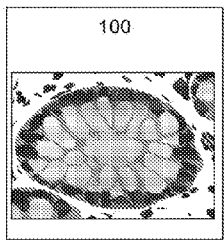
FIGS. 8a-8c show digital images depicting the flow of top-down image segmentation analysis.
Figure 8B:
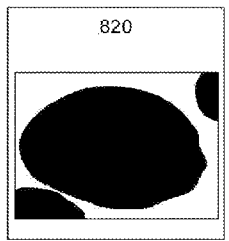

The top-down confidence map 701 may then be converted to a negative, or inverted, binary confidence map (step 720). FIG. 8b shows an exemplary binary confidence map 820 generated from top-down confidence map 701. For example, a white cell in the confidence map 701 represents one-hundred-percent confidence that the pixel represents a portion of the gland region 150. A black pixel in the confidence map 701 represents a one-hundred-percent confidence that the pixel represents a portion of the stroma region 110. A threshold value of fifty-percent may be applied to produce the binary confidence map 820 as follows. With a threshold value of fifty-percent, all the pixels in confidence map 701 having likelihood values no less than fifty-percent are converted to black, representing gland region 150, and all others converted to white representing, stroma region 110. Converting high likelihood pixels to black and low likelihood pixels to white results in the binarized confidence map 820 depicted in FIG. 8b. Suitable threshold values may be determined dynamically or may be supplied by a user. A person of skill in the art will recognize the advantage of applying different threshold values based on properties of the digital image.

Figure 8C:
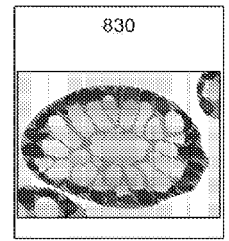

Binary confidence map 820 may then serve as an image mark to be applied to the original grayscale digital pathology image 100 to change all of the detected stroma pixels (represented as white pixels in the binary confidence map 520) to a constant value (step 730). The constant value may be predefined. The resultant suppressed stroma image 830, depicted in FIG. 8c, shows the entire stroma region as a uniform gray.

The final step of the information fusion process of the present embodiment is to perform bottom-up processing on the suppressed stroma image 830 (step 740). Bottom-up image processing, as previously described with respect to step 401, may comprise one or more of the steps of anisotropic diffusion, Otsu thresholding, and connected component analysis. The resultant stroma suppressed nucleus binary image 702 is expected to retain good local contour information with a reduced occurrence of false positives as compared to the image produced by bottom-up processing alone.

A person of skill in the art will recognize that the information fusion process described with reference to FIG. 7. may be adapted to isolate or suppress any tissue feature of an original digital pathology image. The information fusion process described here is not limited to stroma suppression, as described in the foregoing example.

In exemplary embodiments, pseudo-bootstrapping may be performed to reduced false negative results, that is, in the exemplary binary image 640 of FIG. 6c, pixels representing the nucleus region that may be erroneously colored black, or associated with a Boolean value of FALSE Bootstrapping is a boosting scheme in machine learning that iteratively trains and evaluates classifiers without requiring extra resources. The technique of the present embodiment is referred to as "pseudo-bootstrapping" because it uses principles similar to those of conventional bootstrapping techniques. Unlike conventional bootstrapping, pseudo-bootstrapping may be performed without requiring additional user-labeled data from outside of the image.

Returning now to FIG. 4, the pseudo-bootstrapping process will be described. The Boolean TRUE and FALSE values associated with each white or black pixel of a binary digital image as previously described will be used in the following description of the pseudo-bootstrapping process. As previously described, the bottom-up processing in step 401 produces a clean nucleus binary image 640. Data set Nucleus_BottomUp 412 is made to store clean nucleus binary image 640. As also previously described, information fusion process 402 produces a stroma-suppressed gland nucleus binary image 702. Data set Nucleus_Fusion 411 is made to store a stroma suppressed gland nucleus binary image 702. A top-down binary confidence map (CM) 410 in FIG. 4 is produced by thresholding confidence map 701. Confidence map (CM) 410 is an inverted version of confidence map 820. The white and black pixels of Confidence map (CM) 410 thus represent the Boolean TRUE and FALSE values indicating gland 150 and stroma 110 respectively.

In step 403, the variables input_0 and input_1 are initialized as equal to the data sets Nucleus_BottomUp 412 and Nucleus_Fusion 411, respectively. At this point, Nucleus_Fusion represents the current best classification of the pixels of the original digital pathology image 100 as belonging to the segmented nucleus region 121, represented by TRUE values. Nucleus_BottomUp 412 represents the second best classification of the pixels. Thus, input_1 and input_0 represent the best and second best pixel classifications available. In step 404, the iteration counting variable BS_iter is initialized.

The pseudo-bootstrapping process may involve one or more iterations. In exemplary embodiments, pseudo-bootstrapping involves M iterations. The variable may be user-defined or determined dynamically. A person of skill in the art will recognize that optimum values of M may depend on image properties and available computing power as well as other factors. Excessive bootstrapping iterations may accumulate processing errors, while insufficient iterations may be unable to fully make use of the relationship between Nucleus_BottomUp 412 and Nucleus_Fusion 411.

If M iterations have not been performed (step 420), the pseudo-bootstrapping process continues with comparing the data sets input_0, input_1, and CM (step 430). As previously described, data sets input_0 and input_1 are binary images storing information indicating whether or not a particular pixel belongs to nucleus region 120. Data set input_0 is calculated by bottom up processing, and data set input_1 is calculated by information fusion. Also as previously described, data set CM 410 is a binary confidence map storing information indicating whether or not a particular pixel belongs to gland region 150. Boolean values associated with each individual pixel are compared among the three data sets, input_0, input_1, and CM (step 430). The comparison may be represented by the Boolean phrase (input_1=TRUE) OR ((input_0=TRUE) AND (CM=TRUE)).

In step 413, a Temporary Image is generated after evaluating the Boolean phrase pixel-by-pixel. For each pixel of the original digital pathology image 100 for which the Boolean phrase evaluates as TRUE, the corresponding Temporary Image pixel is set to that pixel's original image density value. For each pixel of the original digital pathology image 100 for which the Boolean phrase evaluates as FALSE, the corresponding Temporary Image pixel is suppressed, i.e. set to a constant value. For a given pixel, the Boolean phrase evaluates as TRUE when either the Boolean value associated with that pixel stored in input_1 is TRUE or both the Boolean value associated with that pixel stored in input_0 and the Boolean value associated with that pixel stored in CM 410 is TRUE. The Boolean phrase outputs FALSE when the Boolean value stored in input_1 is FALSE and either the Boolean value stored in input_0 or the Boolean value stored in CM 410 is FALSE.

In step 405, bottom-up processing may be performed on the newly generated Temporary Image 413. As described above, bottom-up processing may comprise one or more of anisotropic diffusion, Otsu thresholding, and connected component analysis. Bottom-up processing step 405 uses the Temporary Image 413 to generate a data set Nucleus_Bootstrap 415. Data set Nucleus_Bootstrap stores a binary image, the pixels of which are associated with Boolean values indicating whether each pixel of the original grayscale digital pathology image 100 belongs to a nucleus region 120. Nucleus_Bootstrap data set 415 represents the current best classification of the pixels of the original grayscale digital pathology image 100 as belonging to the nucleus region 120, represented by TRUE values as a result of the current iteration.

In step 406, the value of the iteration variable BS_iter is incremented, and the variables input_0 and input_1 are updated. Input_1, the previous best classification, is stored in input_0. Nucleus_Bootstrap data set 415, the current best classification, is then stored as input_1.

If the iteration number M has been reached (step 420), the pseudo-bootstrapping process ends and the current best classification, represented by the Nucleus_Bootstrap data set 415, is stored as Segmented_Nucleus data set 300 (step 450). Segmented_Nucleus data set 300 stores a binary image, the pixels of which are associated with Boolean values representing whether each pixel of the original grayscale pathology image 100 is a member of the segmented nucleus region 121.

Upon completion of the first sub-task, all pixels of the image 100 which represent areas belonging to the nucleus region 120 will be associated with at least one shared feature in an output data set. For example, all pixels representing the gland nucleus region 120 may be colored white and associated with a Boolean value of TRUE in the Segmented_Nucleus data set 300, as previously described.

FIG. 9 is a flowchart showing the steps of an exemplary second image segmentation sub-task consistent with the present disclosure. In this exemplary embodiment, the second sub-task comprises segmenting the image area that does not make up the segmented nucleus region 121 into a segmented stroma region 111 and a segmented goblet-lumen region 161. As described above, distinguishing the stroma region 110 from the goblet-lumen region 160 is not always straightforward. Furthermore, in some pathology images, no goblet-lumen region exists, and processing techniques employed must account for this possibility. Such processing techniques may employ prior knowledge of image characteristics. For instance, a goblet-lumen region 160 often has a higher average image intensity than that of other tissue regions, such as the gland 150, nucleus 120, and stroma 110 regions. A detected goblet-lumen region 160 may be double-checked by calculating its average image intensity. If the average image intensity of the detected goblet-lumen region 160 is not higher than other tissue regions, then the detection may be a false goblet-lumen region 160, and may be corrected as stroma region 110.

In exemplary embodiments described here, the second sub-task may be implemented as another information fusion process. For example, a top-down confidence map data set 911 illustrating the likelihood that each pixel represents an area of the gland region 150, similar to that of exemplary top-down confidence map 701, may be generated. In step 902, thresholding and smoothing may be performed based on top-down confidence map data set 911. Suitable threshold or smoothing values may be determined dynamically or may be supplied by a user. A person of skill in the art will recognize the advantage of applying different threshold or smoothing values based on properties of the digital image.

As a result of step 902, temporary gland part data set 912 and temporary stroma part data set 913 are determined. Temporary gland part data set 912 and temporary stroma part data set 913 each store a binary image, the pixels of which are associated with Boolean values representing whether a pixel of the grayscale digital pathology image 100 belongs to either the gland part or the stroma part, respectively.

In step 903, Segmented_Nucleus data set 300, produced by the pseudo-bootstrapping process shown in FIG. 4 (step 901), is combined with the temporary gland part data set 912. When Segmented_Nucleus data set 300 is subtracted from temporary gland part data set 912, the result is the data set temporary goblet-lumen part 914. Because the gland region 150 consists entirely of the nucleus region 120 and the goblet-lumen region 160, subtracting the nucleus region 120 from the gland region 150 leaves the goblet-lumen region 160.

Temporary stroma part data set 913 and temporary goblet-lumen part data set 914 may be polished to further refine the segmentation of the goblet-lumen region 160 (step 904). As previously stated, in some pathology images, no goblet-lumen region 160 exists, and processing techniques employed must account for this possibility. For such challenging cases, it is possible that neither temporary stroma part data set 913 nor temporary goblet-lumen part data set 914 is one hundred percent correct. For example, a portion of temporary goblet-lumen part data set 914 may be incorrectly segmented and should properly be segmented as stroma region 110. Polishing step 904 may be implemented based on prior knowledge of tissue characteristics: for instance, that the average image intensity of a goblet-lumen region 160 is higher than that of other tissue regions. Polishing step 904 may employ connected component analysis to estimate the average image intensity value of each connected component. Those components classified as goblet-lumen region 160 but having a smaller average image intensity than a pre-defined intensity threshold may be changed into stroma region 110. A pre-defined intensity threshold may be based on user-defined parameters or parameters defined by a dynamic process. A person of skill in the art will recognize the value of applying different parameters in this analysis step based on properties of the image.

As a result of step 904, segmented goblet-lumen data set 915 is obtained. Segmented goblet-lumen data set 915 stores a binary image, the pixels of which are associated with Boolean values indicating whether each pixel of the original image 100 belongs to goblet-lumen region 160. The elements of the segmented goblet-lumen data set 915 associated with a TRUE value represent the pixels of the segmented goblet-lumen region 161.

In step 905, the segmented goblet-lumen data set 915 is combined with the segmented nucleus data set 300. Subtracting the segmented goblet-lumen set 915 and the Segmented_Nucleus data set 300 from an image foreground, produces segmented stroma data set 916.

An image foreground is the area of the digital pathology image containing tissue image data. Many digital pathology images, such as that shown in FIG. 1, are comprised entirely of image foreground. When the goblet lumen data set 915 and the segmented nucleus data set 300 are subtracted from the image foreground, only those pixels representing the stroma region 110 remain. Thus, segmented stroma data set 916 is produced. Segmented stroma data set 916 stores a binary image, the pixels of which are associated with Boolean values representing whether each pixel of the original image 100 belongs to the stroma region 110. The elements of the segmented stroma data set 916 associated with a TRUE value represent the pixels of the segmented stroma region 111.

Figure 10:
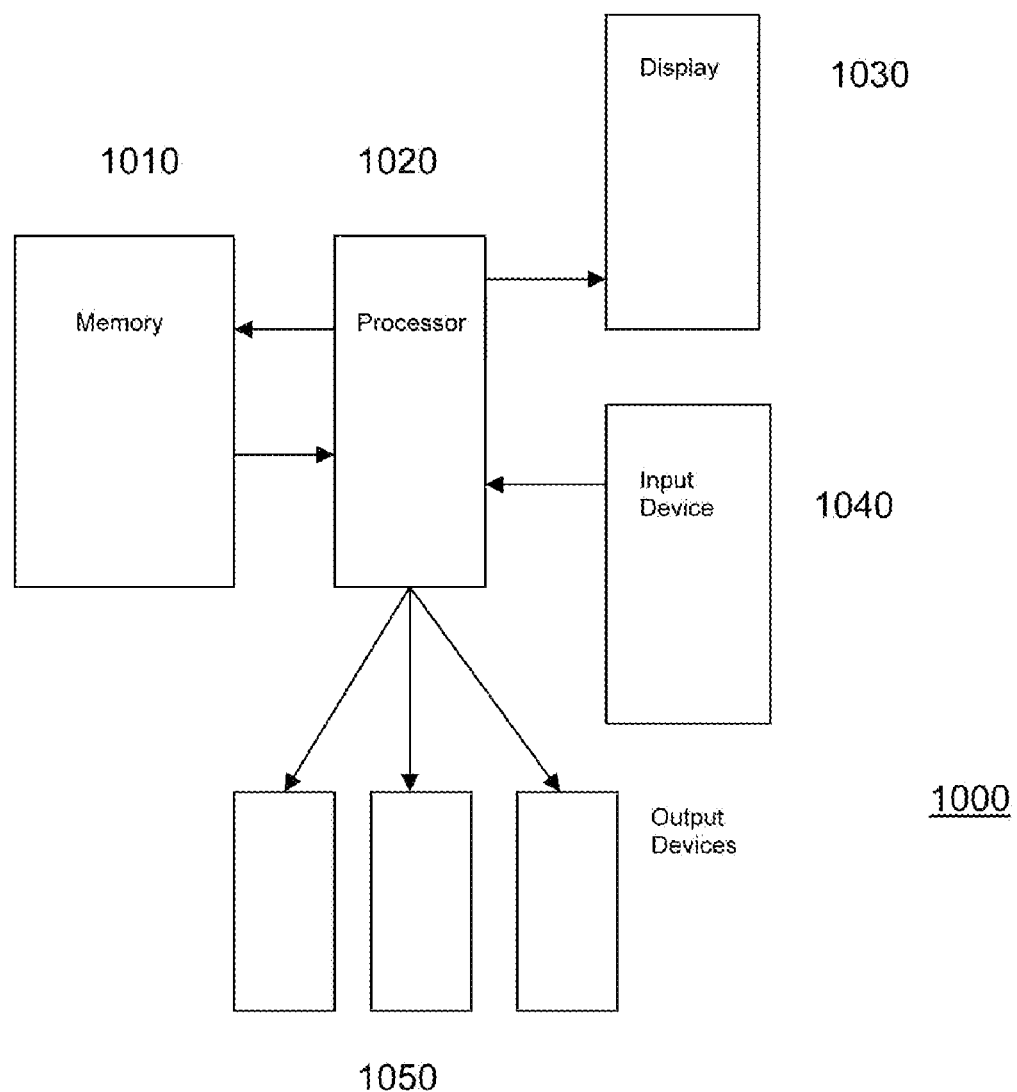
FIG. 10 is an image depicting a computer system which may implement the discloses methods and techniques.

FIG. 10 illustrates a system 1000 consistent with the present disclosure. The techniques and methods described herein may be carried out by a system comprising a memory 1010, a processor 1020, and a display 1030. Images and data sets described herein may be stored in memory 1010. Memory 1010 may include any storage device capable of storing data processed by processor 1020. Memory 1010 may be, for example, a floppy disk, or other magnetic medium, or a blank RAM. Processing steps may be carried out by processor 1020. Processor 1020 may be any commonly available digital processor or may be a special purpose digital processor. Software stored on the computer memory may contain instructions to perform the steps described herein. Results of the disclosed methods and techniques may be displayed on a computer display 1030. A user input device, such as a keyboard 1040, may be provided to permit user interaction. Additional output devices 1050, such as a printer, may also be provided.

Image segmentation techniques disclosed here provide tissue classification data which may provide valuable information for a variety of pathology analysis tasks. Image segmentation techniques disclosed here may be utilized to improve the efficiency and accuracy of cancer grading techniques. Techniques and methods disclosed here may be utilized with conventional manual cancer grading techniques, for instance by permitting a pathologist to examine only the tissue types that are of interest. Techniques and methods disclosed herein may be integrated with automated cancer grading methods and techniques, for instance by classifying different tissue regions to which various automated cancer grading techniques may be applied. The image segmentation techniques disclosed here may be combined with automated cancer grading methods to form a complete computer aided diagnosis system.

From the foregoing description, it will be appreciated that the present invention provides a method and apparatus for the efficient and accurate segmentation of a digital pathology image. The proposed pseudo-bootstrapping segmentation method for integrating top-down and bottom-up image analysis can be generalized to all types of pathology images, particularly those that are characterized by super-high image resolution, non-uniformly distributed texture patterns, and densely-structured segments. Additionally, methods and systems disclosed herein reduce false positive results. False negative results may also be reduced and false positive results further reduced by iteratively performing bottom-up image analysis on subsets of the whole image foreground. It is also contemplated that this segmentation pipeline may be integrated with a cancer grading algorithm, from which a complete computer-aided diagnosis (CAD) system may be developed.

The foregoing methods and systems have been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

The methods disclosed herein may be implemented as a computer program product, i.e., a computer program comprising instructions tangibly embodied on an information carrier, e.g., in a machine-readable storage device, or a tangible computer-readable medium, which when executed for execution control the operation of one or more computers, processors, or logic to perform the steps of the method. A computer program can be written in any form of programming language, including compiled or interpreted languages, and it can be deployed in any form, including as a standalone program or as one or more modules, components, subroutines, or other unit suitable for use in a computing environment. A computer program can be deployed to be executed on one computer or on multiple computers at one site or distributed across multiple sites and interconnected by a communication network.

From the foregoing description, it will be appreciated that the methods and apparatus described herein to segment digital pathology images may be adapted to segment and analyze any digital images having characteristics suitable to these techniques, such as high image resolution, non-uniformly distributed texture patters, and densely structured segments. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented segmentation method for segmenting a digitized pathology image of tissue into at least two non-overlapping regions for use in disease diagnosis, the method comprising:

generating a first initial data set comprising a segmentation of pixels in the digitized pathology image as belonging to a first region using a first method of processing;

generating a second initial data set comprising a current best segmentation of pixels in the digitized pathology image as belonging to the first region using a second method of processing;

iteratively determining a final first region data set based on the first and second initial data sets, wherein the final first region data set comprises a segmentation of pixels in the digitized pathology image as belonging to the first region; and segmenting the digitized pathology image into a first region and a remainder region based on the final first region data set, wherein the generating of the first and second initial data sets, the iteratively determining and the segmenting are performed by a processor.

2. The method of claim 1, wherein the first method of processing comprises the steps of:
performing anisotropic diffusion on the digitized pathology image;
performing binary thresholding on results of the anisotropic diffusion step; and
performing connected-component analysis on results of the binary thresholding step.

3. The method of claim 1, wherein the second method of processing comprises the steps of:
generating a confidence map of a second region through feature extraction;
generating a first binary confidence map based on thresholding the confidence map;
applying the binary confidence map as an image mark to the digital pathology image to suppress the pixels of the second region to a constant value;
generating a second digitized pathology image with pixels of the second region set to a constant value; and
generating the second initial data set comprising a segmentation of pixels in the digitized pathology image as belonging to the first region using a bottom-up processing method applied to the second digitized pathology image.

4. The method of claim 3, wherein iteratively determining the final first region data set based on the first and second initial data sets comprises the steps of:
generating a second binary confidence map based on thresholding the confidence map;
storing data of the first initial data set in a first iterative data set;
storing data of the second initial data set in a second iterative data set;
performing, until a threshold is met, an iterative loop comprising the steps of:
comparing the first iterative data set, the second iterative data set, and the second binary confidence map to produce a temporary image;
generating a bootstrap data set by processing the temporary image with bottom-up processing;
overwriting data of the first iterative data set with data of the second iterative data set; and
overwriting data of the second iterative data set with data of the bootstrap data set.

5. The method of claim 1, further comprising the steps of:
generating a top-down confidence map of the remainder region, wherein the top-down confidence map represents the likelihood that a pixel in the remainder does not represent an area of a second region;
determining a final third region data set from the confidence map and the final first region data set;
generating a final second region data set by subtracting the final first region data set and the final third region data set from a foreground of the digitized pathology image; and
segmenting the remainder region into second and third non-overlapping regions based on the final second and final third region data sets.

6. The method of claim 5, wherein determining a final third region data set from the confidence map and the final first region data set comprises the steps of:
determining a temporary fourth region data set and a temporary second region data set based on the top-down confidence map and the remainder of the tissue, wherein each temporary data set stores values representing whether a pixel of the digitized pathology image belongs to either the second region or fourth region,
subtracting the temporary fourth region data set from the final first region data set to obtain a temporary third region data set; and
polishing the temporary third region data set to obtain the final third region data set.

7. The method of claim 6, wherein
the first region is a nucleus region;
the second region is a stroma region;
the third region is a goblet-lumen region; and
the fourth region is a gland region.

8. A computer-implemented information fusion method for segmenting a digitized pathology image of tissue into regions for use in disease diagnosis, the method comprising:
generating a confidence map of an unwanted region of the tissue by feature extraction;
obtaining a binary confidence map by thresholding the confidence map;
applying the binary confidence map as an image mark to the digital pathology image to suppress the unwanted region, wherein suppressing the unwanted region comprises changing pixel values of pixels in the unwanted region to a constant value;
generating a version of the digitized pathology image with pixels of the unwanted region set to a constant value; and
generating a data set comprising a segmentation of pixels in the digitized pathology image as belonging to the first region using a bottom-up processing method, wherein the generating of the confidence map, the version of the digitized pathology image and the data set, the obtaining the binary confidence map and the applying the binary confidence map are performed by a processor.

9. A system for segmenting a digital image into at least two segments comprising:
a memory having program instructions and data storage space;
a processor configured to use the program instructions to perform the steps of:
generating a first initial data set comprising a segmentation of pixels in the digitized pathology image as belonging to a first region using a first method of processing;
generating a second initial data set comprising a current best segmentation of pixels in the digitized pathology image as belonging to the first region using a second method of processing;
iteratively determining a final first region data set based on the first and second initial data sets, wherein the final first region data set comprises a segmentation of pixels in the digitized pathology image as belonging to the first region; and
segmenting the digitized pathology image into a first region and a remainder region based on the final first region data set.

10. The system as recited in claim 9, wherein the processor configured for performing the first method of processing is further configured for:
performing anisotropic diffusion on the digitized pathology image;

performing binary thresholding on results of the anisotropic diffusion step; and performing connected-component analysis on results of the binary thresholding step.

11. The system as recited in claim 9, wherein the processor configured for performing the second method of processing is further configured for:

generating a confidence map of a second region through feature extraction;

generating a first binary confidence map based on thresholding the confidence map;

applying the binary confidence map as an image mark to the digital pathology image to suppress the pixels of the second region to a constant value;

generating a second digitized pathology image with pixels of the second region set to a constant value; and generating the second initial data set comprising a segmentation of pixels in the digitized pathology image as belonging to the first region using a bottom-up processing method applied to the second digitized pathology image.

12. The system as recited in claim 11, wherein the processor configured for iteratively determining the final first region data set based on the first and second initial data sets is further configured for:

generating a second binary confidence map based on thresholding the confidence map;

storing data of the first initial data set in a first iterative data set;

storing data of the second initial data set in a second iterative data set;

performing, until a threshold is met, an iterative loop comprising the steps of:

comparing the first iterative data set, the second iterative data set, and the second binary confidence map to produce a temporary image;

generating a bootstrap data set by processing the temporary image with bottom-up processing;

overwriting data of the first iterative data set with data of the second iterative data set; and overwriting data of the second iterative data set with data of the bootstrap data set.

13. The system as recited in claim 9, wherein the processor is further configured for:

generating a top-down confidence map of the remainder region, wherein the top-down confidence map represents the likelihood that a pixel in the remainder does not represent an area of a second region;

determining a final third region data set from the confidence map and the final first region data set;

generating a final second region data set by subtracting the final first region data set and the final third region data set from a foreground of the digitized pathology image; and segmenting the remainder region into second and third non-overlapping regions based on the final second and final third region data sets.

14. The system as recited in claim 13, wherein the processor configured for determining a final third region data set from the confidence map and the final first region data set, is further configured for:

determining a temporary fourth region data set and a temporary second region data set based on the top-down confidence map and the remainder of the tissue, wherein each temporary data set stores values representing whether a pixel of the digitized pathology image belongs to either the second region or fourth region, subtracting the temporary fourth region data set from the final first region data set to obtain a temporary third region data set; and polishing the temporary third region data set to obtain the final third region data set.

15. The system as recited in claim 14, wherein the first region is a nucleus region;

the second region is a stroma region;

the third region is a goblet-lumen region; and the fourth region is a gland region.

* * * * *